United States Patent
Bucher

[15] 3,654,039
[45] Apr. 4, 1972

[54] GLASS LAMINATING PROCEDURE APPARATUS

[72] Inventor: Emil W. Bucher, Lake Bluff, Ill.
[73] Assignee: Lumni-Strip, Inc., Lake Bluff, Ill.
[22] Filed: Feb. 19, 1970
[21] Appl. No.: 1,552

[52] U.S. Cl..............................156/558, 156/99, 156/299, 156/580, 118/118
[51] Int. Cl. ...................B32b 31/20, B32b 31/12
[58] Field of Search..............156/99, 100, 103, 105, 106, 156/295, 299, 554, 555, 556, 557, 558, 559, 560, 561, 562, 563, 580; 118/118, 119

[56] References Cited

UNITED STATES PATENTS

| | | | |
|---|---|---|---|
| 3,518,137 | 6/1970 | Hamilton | 156/99 X |
| 2,729,584 | 1/1956 | Foster | 156/558 X |
| 3,312,191 | 4/1967 | Lowe | 118/119 X |
| 3,063,407 | 11/1962 | Bergstein | 118/118 X |
| 3,542,623 | 11/1970 | Sonneborn et al. | 156/550 X |

Primary Examiner—Benjamin A. Borchelt
Assistant Examiner—James M. Hanley
Attorney—Wolfe, Hubbard, Leydig, Voit & Osann

[57] ABSTRACT

An apparatus for producing laminated glass free of bubbles which includes a cylindrical metering bar interposed between upper and lower convergently-arranged, moving strips of glass which not only meters liquid adhesive but which serves as a doctor to fill any shallow depressions in the glass, thereby to establish perfectly planar adhesive surfaces which are subsequently brought into face contact at a nip using optimum pressure so that a full charge of adhesive is maintained in all of the shallow depressions. In a preferred embodiment the metering bar has metering grooves formed by closely spaced convolutions of wire and is rotated at a peripheral speed which is a small fraction of the speed of movement of the glass strips.

8 Claims, 8 Drawing Figures

Patented April 4, 1972
3,654,039
2 Sheets-Sheet 1
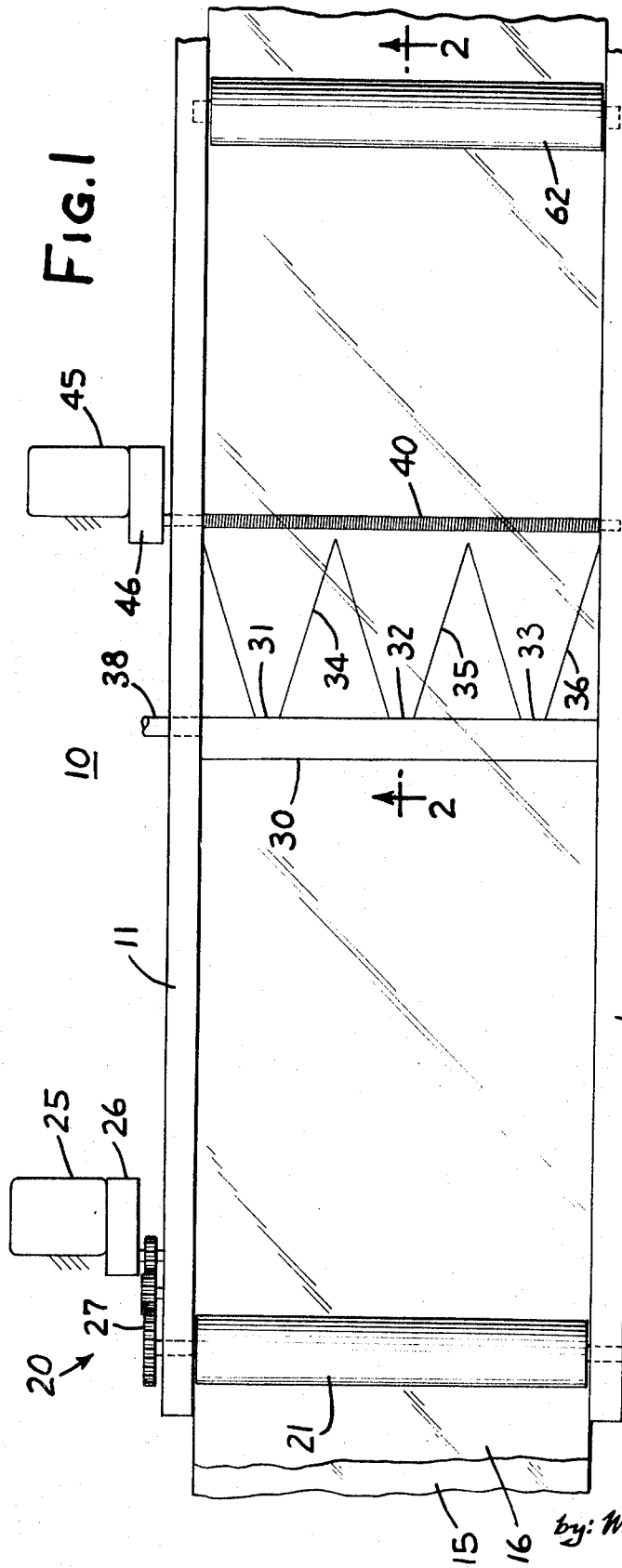
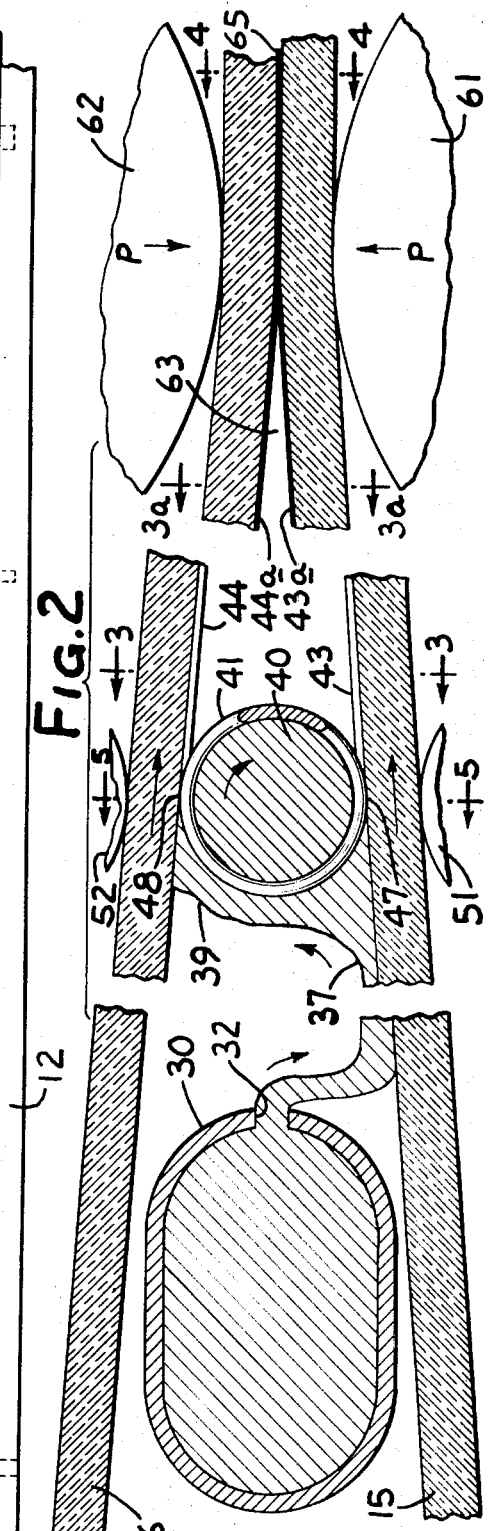
INVENTOR
EMIL W. BUCHER
by: Wolfe, Hubbard, Voit & Osann
ATTYS.

Patented April 4, 1972
3,654,039
2 Sheets-Sheet 2
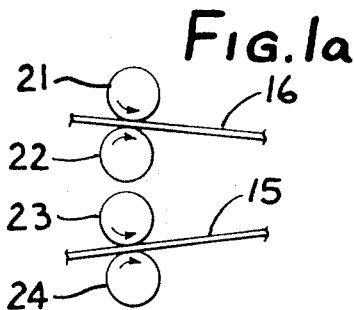
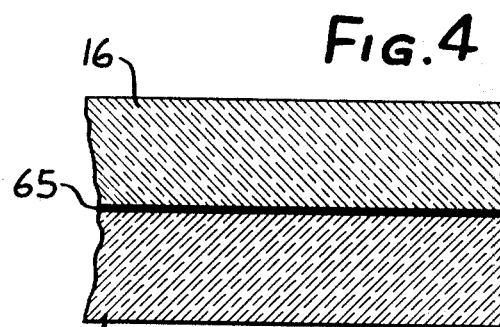
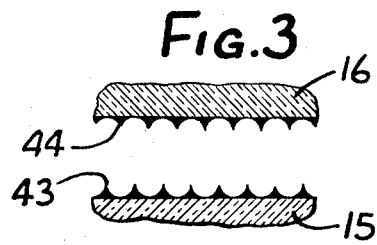
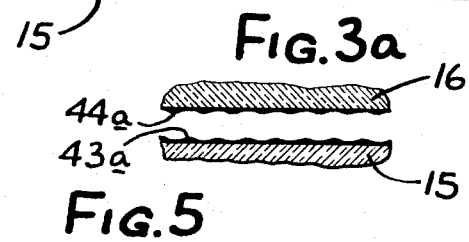
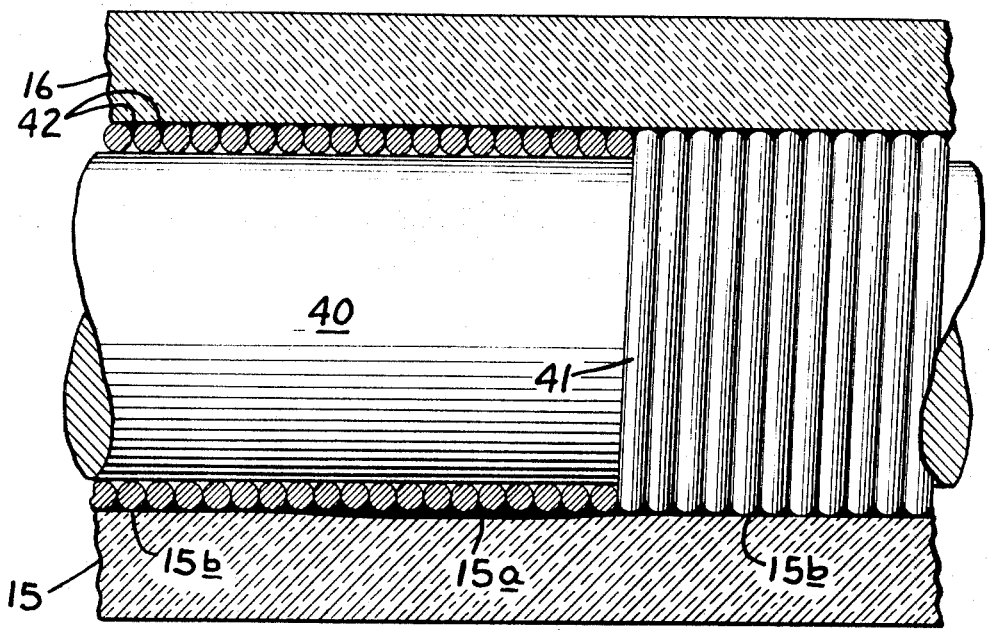
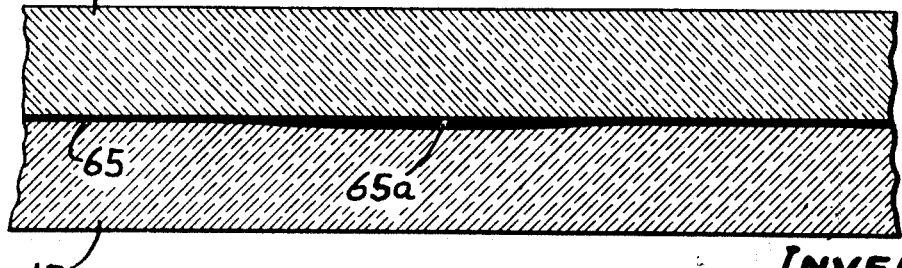
INVENTOR
EMIL W. BUCHER
by: Wolfe, Hubbard, Voit & Osann
ATTYS.

GLASS LAMINATING PROCEDURE APPARATUS

In the manufacture of laminated glass using a clear adhesive, various methods of coating the surfaces have been employed including roll coating, spray coating, knife-over-roller coating, curtain coating and extrusion coating. Many of these coating procedures work well with high quality glass having a perfectly planar surface and with adhesive of optimum viscosity, but difficulty has been experienced in producing laminated glass, free of voids, where the panes are of lesser quality with surface irregularity in the form of shallow depressions. The procedures for applying an even coating of adhesive have, for the most part, failed to take into account the shallow depressions and relatively high pressures are resorted to for securing the required all-over contact. When the pressure of fabrication is released the glass tends, over a period of time, to restore itself to its original shape which, I have found, serves to account for the bubbles and voids which sometimes appear spontaneously long after the glass has been laminated.

Moreover, it has been found difficult to coat glass surfaces with an even and predictable layer of viscous adhesive. The adhesive, depending upon the viscosity, tends to create a striated pattern, referred to as "corduroy". Random variations in thickness of the adhesive often results in entrapment of bubbles of air as the two layers are brought together even though the glass itself is of high quality.

It is accordingly an object of the present invention to provide a procedure and apparatus which overcomes the disadvantages of conventional laminating apparatus and procedures and which is capable of producing laminated glass which is uniformly free of entrapped air, which avoids the formation of voids subsequent to manufacture, and which is capable of producing good results at efficient production rates using glass of widely different quality and degree of flatness.

It is a more detailed object of the invention to provide a glass-laminating procedure and apparatus which employs a metering bar having peripheral, closely spaced metering grooves and which rides in substantial contact with the presented surfaces thereby to deposit a pre-determined amount of adhesive per unit area on the "high" regions and which serves as a doctor to fill any "low" regions with a charge of adhesive so that resulting adhesive surfaces are perfectly planar prior to joining at a nip. Moreover, relatively light forces are applied at the nip so that there is no tendency to squeeze adhesive out of the shallow depressions and so that the optimum distribution of adhesive remains unaffected by the joining step, thus obviating void-producing changes in the adhesive as a result of the subsequent efforts of the glass to relieve stored stress.

It is still another object of the invention to provide a procedure and apparatus for laminating glass which is capable of employing adhesive having a wide range of viscosity and chemical composition, which avoids the random "corduroy" effect sometimes produced, especially when using particularly viscous adhesives, and which, instead, imposes upon the coated surface a pre-determined, fine longitudinal pattern which tends to flatten further prior to joining and which precludes the entrapment of air bubbles.

Generally stated, it is an object to provide a machine for laminating glass which is not only effective but which is economical, using a minimum number of simply-formed parts, which may be used on a custom basis for producing small runs or for automated high production, and which, once set up, is capable of operating over long periods without any care or adjustment, notwithstanding variations in the nature of the glass surface or in the nature of the adhesive being applied.

Other objects and advantages of the invention will become apparent by reading the attached detailed description upon reference to the drawings in which:

FIG. 1 is a plan view of a glass laminating apparatus;

FIG. 1a is a diagram showing the drive rollers;

FIG. 2 is an enlarged vertical section, considerably foreshortened, taken along line 2—2 in FIG. 1;

FIG. 3 is a fragmentary vertical section taken along the line 3—3 in FIG. 2;

FIG. 3a is a similar section taken along the line 3a—3a in FIG. 2;

FIG. 4 is a fragmentary section looking along the line 4—4, taken through the completed laminate, in FIG. 2;

FIG. 5 is a vertical section taken through the metering bar along the line 5—5 in FIG. 2 showing the function of the metering bar as a doctor in the filling of a shallow depression; and FIG. 6 is a section showing the completed laminate formed by the glass sections of FIG. 5.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Turning now to the drawings there is shown in FIG. 1 a laminating machine 10 constructed in accordance with the present invention having a frame which includes side rails 11, 12. Guided horizontally between the side rails is a lower strip of glass 15 and an upper strip of glass 16 which follow convergent paths as shown in FIG. 2. Means, generally indicated at 20, are provided at the inlet, or left hand, end of the machine for supporting and propelling the two strips of glass synchronized with one another. In the present instance this is achieved by pairs of rollers 21, 22 and 23, 24 driven by a motor 25 having a speed reducer 26 and suitable set of gearing 27.

Means are provided for discharging a layer of liquid adhesive on the lower pane of glass with the adhesive being free to flow laterally into a generally flat layer which extends across the width of the strip. In the present instance this is accomplished by a transversely extending manifold 30 which bridges the distance between the side rails 11, 12 and which has a plurality of orifices 31, 32, 33 for feeding adhesive which fans out into ribbons 34, 35, 36 which eventually join to form a continuous ribbon 37. The manifold 30 is fed from a supply line 38 connected to a suitable, slightly pressurized source, with the degree of pressure being dependent upon the viscosity of adhesive, the size of the orifices, and the desired rate of flow. For insuring that the pressure at the orifices is generally equalized, the manifold preferably has sufficient volume to maintain approximately the same internal pressure throughout its length. It will be understood that while a manifold has been shown by way of illustration, it will be apparent to one skilled in the art that the individual orifices 31, 32, 33 may, if desired, be supplied by separate supply lines under the control of individual valves to adjust the rate of discharge with a high degree of precision at the three points. Moreover, it will be understood that while three orifices have been shown, any desired number of orifices may be used, spaced across the width of the machine.

In accordance with the present invention a cylindrical metering bar located a short distance downstream from the manifold 30 and extending transversely to the direction of movement is interposed between the upper and lower strips of glass, in substantial contact with both of them, and rotated slowly in a direction to convey adhesive to the upper strip of glass, the bar having a surface characterized by closely spaced circular grooves which define metering orifices for depositing adhesive in evenly distributed amounts upon the engaged surfaces and acting as a doctor to fill shallow depressions thereby to establish a planar adhesive surface on both of these strips for subsequent joining at a nip with optimum applied pressure. Thus, referring to the drawings, a metering bar 40 is used which has a perfectly cylindrical shape. For forming grooves of predetermined cross section the bar is wound with closely spaced convolutions of wire 41 using wire of circular cross section. The grooves between the adjacent convolutions, indicated at 42, and which are flaring configuration, serve to apply a fine, evenly distributed pattern of ridges of adhesive indicated at 43, 44 (FIG. 3). The bar 40 is rotated in the "reverse" direction shown by means of the motor 45 having a speed reducer 46 so that the adhesive is fed upwardly along the backside of the bar in the form of a bridge of adhesive as indicated at 39 extending in continuous engagement with both strips.

In order to achieve accurate metering, and accurate positioning of the bar 40 to serve as a doctor, the bar is caused to engage the presented surfaces of the glass strips along lines 47, 48 respectively. For maintaining the strips of glass in contact with the upper and lower passes of the metering bar, auxiliary metering bar rollers 51, 52, shown only fragmentarily, may be used. Such rollers may be journaled in the side frame, and may be either resiliently surfaced or hard-surfaced and resiliently biased toward the glass strips. Preferably the rollers 51, 52 apply pressure to the strips which is just sufficient to establish contact with the metering roller, the per-unit pressure being sufficiently low as to avoid any localized deformation of the glass from point to point along the length of the bar. The rollers 51, 52 need not be alined with the metering bar, just as long as the desired contact is obtained.

As the fine pattern of longitudinal ridges passes downstream from the metering bar, the ridges 43, 44 shown with exaggerated clarity in FIG. 3, tend to flatten out to produce either a flat or slightly undulating cross section as shown at 43a, 44a in FIG. 3a.

For the purpose of joining the strips of glass face to face at a shallow nip, nipping rollers 61, 62, producing a nip 63, are provided which are arranged in vertically opposed positions journaled in the frame, for example, in the side rails, and with means for convenient adjustment of the per-unit pressure indicated at P in FIG. 2. The nipping rollers may if desired be formed of resilient material or may be relatively hard-surfaced with means for applying adjustable bias, or a combination of the two. In any event, in carrying out the invention, a per-unit pressure P is applied which is high enough to bring the adhesive surfaces into progressive, all-over face contact but which is sufficiently low as to avoid localized deformation of the glass particularly where the opposed surfaces of the glass are not perfectly flat but exhibit the shallow depressions which are common in glass of grade lesser than plate glass. In effecting adjustment the pressure at the nip may be gradually increased to the point where face contact is achieved but not appreciably beyond this point.

The primary benefits of the present apparatus and procedure may be understood with respect to FIGS. 5 and 6. FIG. 5 is a vertical section taken through the metering bar as the bar encounters a shallow depression existing in the presented surface of the lower strip 15. The shallow depression being indicated at 15a in FIG. 5. In the surrounding "high" regions 15b, the convolutions of the wire 41 are in direct engagement with the surface of the glass strip to produce the fine pattern of longitudinal ridges previously referred to at 43, 44 and with the adhesive present in a precisely measured quantity per unit area. However, in the "low" region of shallow recess 15a the metering bar departs from its strict metering function and performs, instead, as a doctor to deposit in the recess a charge of adhesive which is sufficient to fill the recess and to bring the level up to the level of the adhesive on the "high" regions of the glass strip, with any excess being struck off. The net result of the use of the metering bar in the environment set forth is that a predetermined quantity of adhesive per unit area is deposited on the "high" regions of the glass surface and a greater amount is deposited in the "low" regions, so that all portions of the presented surface of adhesive lie in a precise planar surface, notwithstanding the depth, size, or distribution of the shallow surface irregularities. The same result is brought about on the presented surface of the upper strip of glass 16. The function of the nipping rollers therefore is simply to apply enough pressure to bring the precisely planar surfaces of adhesive together without changing the distribution of the adhesive upon the strips. Most importantly, the pressure applied by the nipping rollers is less than that which would be capable of locally deforming the strips in the region of a depression which would result in a redistribution of the adhesive and a squeezing out of the adhesive which has been so precisely deposited in the depression. It follows from this that the thickness of the adhesive at a region 65a, corresponding to a depression 15a, is greater then the nominal thickness 65 by an amount which is precisely equal, point-by-point, to the depth of the depression.

It is one of the features of the present invention that, notwithstanding the shallowness of the nip, no air bubbles are entrained as the strips are brought together. While it may be true that the adhesive 43a, 44a just ahead of the nip (FIG. 3a) is not absolutely smooth, nevertheless, the fine pattern of ridges and valleys, being in a longitudinal array, define longitudinal paths for progressive escape of air which may be drawn, by frictional engagement with the adhesive surface, into the region of the nip.

Equally important is the fact that the glass, when it leaves the nipping rollers, is relatively unstressed. This is to be contrasted with a situation where the force applied at the nip is sufficiently great to provide localized deformation of the glass, squeezing out, and hence redistributing, a portion of the charge of adhesive 65a which fills the depression. The displacement of the adhesive, and the accompanying localized deformation of the glass in the region of a depression is believed to account for the voids which have in the past spontaneously appeared in a sheet of laminated glass some time after fabrication. It is believed that the glass, in its effort to relieve stress by returning to its original shape, exerts sufficient outward pulling force as to draw a void, in the form of a bubble or series of bubbles, formed in the transparent adhesive prior to final hardening or curing. Since in the present invention there is no stress developed in the glass which requires relief, no forces are developed capable of pulling voids of this kind.

While the invention is not limited to use of any particular transparent adhesive, I prefer to employ an adhesive which is tightly adherent to glass, optically clear with a compatible refractive index, and which employs a catalyst to permit curing at room temperature within a reasonable length of time. The viscosity upon application may range over wide limits, but a viscosity of about 16,000 centipoise works out well. The pot life should preferably be an hour or two, minimum. Elasticity should be retained down to temperatures approaching −100° F., and final hardness should be about 80 on the Shore A scale. The details of chemical composition of a suitable adhesive material are set forth, for example, in Park U.S. Pat. No. 3,334,008 which issued Aug. 1, 1967 and which is included herein by reference. Briefly stated, such application discloses an unsaturated polyester resin comprising the reaction product of an alpha, betaethylenically unsaturated polycarboxylic acid and a polyol. There is also a

monomer polymerizable with the reaction product, and a silane selected from the class consisting of 3-glycidoxypropyltrimethoxysilane, 3-(trimethoxysilyl) propyl methacrylate, and 3,4-epoxycyclohexylethyltrimethoxysilane.

In a practical case, when laminating glass strips of, say, three thirty-second inch thickness, a metering bar may be employed having a nominal diameter of three-eighth inch, wound with closely spaced convolutions of wire of approximately 26 gauge. Provided that the diameter of the body of the metering rod and the diameter of the wire which forms its outer surface are accurately established, it will be apparent to one skilled in the art that adhesive will be deposited in a precisely flat plane. The gauge of the wire is determined by the amount of adhesive which it is desired to deposit per unit area of the glass and the wire gauge may therefore vary over relatively wide limits, say, from 10 gauge to something over 26 gauge.

During fabrication the strips of glass are fed at a rate of speed on the order of 4 to 10 inches per second. The metering bar is rotated to produce a peripheral speed which is only a small fraction of the speed of advancement of the glass, a speed which is less than 10 percent of the glass speed and which is preferably less than 1 percent of the glass speed, say 1 inch per minute. Even such a slow rate of rotation is sufficient to maintain an adequate reservoir 39 of liquid adhesive along the upper pass of the metering bar.

For the purpose of insuring against lateral escape of the adhesive, particularly where adhesives are used which are at the low end of the viscosity range, the side rails 11, 12 may be spaced, and appropriately surfaced, so as to sealingly engage the lateral edges of the glass strips, particularly in the region of the metering bar and extending back toward the discharge orifices thereby to dam up, and prevent escape of, the collected adhesive 37, 39 (FIG. 2). Indeed, if desired, sealing means may be interposed between the manifold and the presented surfaces of the strips, and the space between the manifold and the metering bar may be filled with a "reservoir" body of adhesive to greater extent than has been shown in FIG. 2.

It is to be particularly noted that viscosities at the higher end of the range may be successfully employed without the random striations or "corduroy" effect which is encountered in spreading viscous adhesive by conventional means. Whether the adhesive is of "thin" or "thick" consistency, it is applied in a consistent, fine longitudinal pattern and occupying a precise plane. It will be understood that the term "planar" used herein as applied to the surface of the adhesive has to do with the fact that the average level of adhesive lies in a plane and not that the surface of the adhesive is perfectly smooth. Indeed, it is one of the features of the invention that shallow longitudinal escape passages are provided for prevention of air entrapment in the shallow nip.

While the machine has been described as having a minimum of glass strip supporting elements, it will be understood that either or both of the strips 15, 16 may be supported upon auxiliary spaced idler rollers which may, in turn, be supported upon the side rails 11 and 12 of the frame. The degree of convergence of the strips, in other words the included angle which may be tolerated between the glass strips leading to the nip, is a matter of designer's choice and depends to some extent upon the thickness of the glass; glass of thinner section being more readily bendable than glass which is thick. This will, in turn, determine the length of the machine from the inlet or drive rollers 21–24 to the final nipping rollers 61, 62. The spreading of the ribbons of adhesive on the lower strip of glass, for a given glass transport speed, may be controlled to some degree by adjustably rocking the machine about the axis of the metering bar.

While the invention has been described in connection with the lamination of glass, it will be understood that the term "glass" is intended in a generic sense to include sheets of other transparent substances as, for example, transparent plastic.

I claim as my invention:

1. In a machine for laminating panes of glass, the combination comprising means for transporting elongated upper and lower strips of glass generally horizontally and convergently to form a shallow nip, means for discharging liquid adhesive across the width of the strips of glass, the liquid adhesive being of such viscosity that it tends to spread out into a flat layer, a cylindrical metering bar located a short distance downstream of the adhesive discharging means and extending transversely to the direction of movement, the bar being rotated slowly in a direction to transport the liquid adhesive along its backside in the form of a bridge of adhesive extending behind the bar in continuous engagement with both strips of glass, the metering bar having its upper and lower surfaces in substantial contact with both of the strips and having closely spaced shallow circular grooves defining metering orifices so that adhesive is deposited in evenly distributed amount upon the engaged surfaces and so that the slowly rotating bar acts as a doctor to fill shallow depressions to establish a planar adhesive surface on both of the strips, and means including nipping rollers for pressing the sheets together with pressure which is high enough to bring the adhesive surfaces into progressive all-over contact but which is sufficiently low as to minimize localized deformation at the shallow depressions thereby to maintain a full charge of adhesive in the shallow depressions.

2. The combination as claimed in claim 1 in which the metering bar is in the form of a rigid cylindrical bar having a shallow, short pitch helical groove with flaring side walls to define the metering orifices.

3. The combination as claimed in claim 1 in which the metering bar is in the form of a rigid cylindrical bar wound with closely spaced convolutions of wire of circular cross section to define the metering orifices.

4. The invention as claimed in claim 3 in which the wire lies within the range of approximately 10 gauge to approximately 26 gauge.

5. The combination as claimed in claim 1 in which the peripheral speed of the metering bar is less than 10 percent of the speed of the strips of glass.

6. The combination as claimed in claim 1 in which the peripheral speed of the metering bar is less than 1 percent of the speed of the strips of glass.

7. The combination as claimed in claim 1 in which side rails are provided in contact with the lateral edges of the glass in the region of the metering bar and extending toward the adhesive discharge means for damming up a quantity of adhesive collected behind the metering bar.

8. The combination as claimed in claim 1 in which the adhesive discharging means includes a manifold extending the width of the strips and having orifices spaced therealong so arranged that adhesive is discharged solely upon the lower strip spreading laterally thereon over the length of the metering bar and in which the adjacent backside of the metering bar is rotated upwardly to transport adhesive upwardly into contact with the upper strip of glass so that both strips become coated and so that the metering bar simultaneously meters a deposit of adhesive upon the presented surfaces of both of the strips.

* * * * *